United States Patent
Brombach (10) Patent No.: US 11,695,278 B2
(45) Date of Patent: Jul. 4, 2023

(54) METHOD AND WIND ENERGY SYSTEM FOR FEEDING ELECTRIC POWER INTO AN ELECTRICITY SUPPLY GRID

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/729,947

(22) Filed: Apr. 26, 2022

(65) Prior Publication Data
US 2022/0344943 A1 Oct. 27, 2022

(30) Foreign Application Priority Data
Apr. 26, 2021 (EP) .................................... 21170492

(51) Int. Cl.
*H02J 3/38* (2006.01)
*H02J 3/46* (2006.01)

(52) U.S. Cl.
CPC ................ *H02J 3/381* (2013.01); *H02J 3/46* (2013.01); *H02J 2300/28* (2020.01)

(58) Field of Classification Search
CPC ...... H02J 3/38; H02J 3/381; H02J 3/46; H02J 2300/28
See application file for complete search history.

(56) References Cited

U.S. PATENT DOCUMENTS

| 10,794,364 | B2 | 10/2020 | Brombach |
| 2019/0170117 | A1 | 6/2019 | Letas |
| 2019/0229735 | A1 | 7/2019 | Schall et al. |
| 2020/0044455 | A1 | 2/2020 | Brombach |

FOREIGN PATENT DOCUMENTS

| CN | 110336318 A | 10/2019 |
| DE | 10 2017 102 018 A1 | 8/2018 |
| EP | 3 496 227 A1 | 6/2019 |
| EP | 3 514 910 A1 | 7/2019 |

*Primary Examiner* — Robert L Deberadinis
(74) *Attorney, Agent, or Firm* — Seed IP Law Group LLP (57) ABSTRACT

Provided is a method for feeding electric power into an electricity supply grid via a connection node by way of a converter-controlled infeed unit, in particular by way of a wind power installation or a wind farm. The grid has a grid voltage and a grid frequency and is characterized by a grid nominal voltage and a grid nominal frequency. The grid voltage of the grid is acquired, a delayed differential angle is ascertained on the basis of the acquired grid voltage. The delayed differential angle corresponds to a difference between an acquired phase signal that indicates a temporal profile of a phase angle of the grid voltage and a phase signal that is delayed with respect to the acquired phase signal. A grid impedance effective for the connection node is acquired, and an infeed power is predefined based on the delayed differential angle and based on the impedance.

17 Claims, 3 Drawing Sheets

METHOD AND WIND ENERGY SYSTEM FOR FEEDING ELECTRIC POWER INTO AN ELECTRICITY SUPPLY GRID

BACKGROUND

Technical Field

The present invention relates to a method for feeding electric power into an electricity supply grid by way of a converter-controlled infeed unit. The invention also relates to a wind energy system for feeding electric power into the electricity supply grid.

Description of the Related Art

A conventional electricity supply grid is or has been at least predominantly fed by directly coupled synchronous generators of large power plants. Such directly coupled synchronous generators operate with voltage injection for physical reasons. They respond immediately to changes in the grid voltage and in the process counteract the voltage change. This results from the nature of a synchronous generator.

Many electricity supply grids are now experiencing an increase in renewable energy sources as feeders into the electricity supply grid. These include wind power installations or wind farms having multiple wind power installations as renewable feeders. Such renewable feeders use at least one converter for feeding the electric power into the electricity supply grid. The use of a converter in this case also comprises the use of an inverter. What is important here is the effect on the electricity supply grid, and in this respect the differences between a converter and an inverter are not of importance here. Any embodiments in relation to an inverter thus also apply to a converter and vice versa, meaning that the term "inverter" would also be synonymously interchangeable here with the term "converter," and vice versa.

The renewable energy sources use such inverters or converters to feed into the electricity supply grid, usually with current injection. In the case of high converter penetration, that is to say in which a large amount of power is fed in by way of converters or inverters, the voltage support provided by directly coupled synchronous generators turns out to be weaker, and it could therefore be considered to use voltage-injecting converters as a solution for grids having a very high converter penetration.

Modern current-injecting converters however have a superior dynamic range for quickly adapting the reference system that manages the infeed to grid changes. Converters that operate with current injection are thus able to adapt quickly to grid changes, which could work against converters that operate with voltage injection. Converters that operate with voltage injection additionally require a large amount of power as control reserve in order also to be able to implement the response to voltage changes required in the case of voltage injection.

The electricity supply grid thus requires damping properties due to the reduction in directly coupled synchronous generators, these damping properties counteracting fast changes. These damping properties may be referred to as an instantaneous reserve and usually come from synchronous generators. Voltage-injecting converters may also provide these properties.

To emulate a behavior of inert machines, and thus to achieve such a damping property, an inert reference system could additionally be integrated into the regulation system of converter-controlled infeed units and act on the current reference. The current reference is in this regard the setpoint value of the current to be fed in, in terms of absolute value and phase. An inert reference system may lead to the fed-in current following a change in the phase position of the grid voltage only with a delay. A frequency change in the grid voltage thus leads to a change in a phase angle between fed-in current and the grid voltage, which is intentionally not adjusted out immediately. This may lead to a change in the fed-in power, which counteracts the frequency change in the grid voltage. This may have a damping effect.

A similar principle is followed by U.S. Pat. No. 10,794,364, in which however an output voltage is predefined at infeed, and the basis is thus in particular a voltage-injecting system. This makes it possible to achieve a particularly fast, intrinsic response to voltage changes in the electricity supply grid. This thus offers a specific solution that is additionally paid for dearly by the use of a voltage-injecting converter-controlled feeder.

Although a voltage-injecting behavior may very well be desirable for converter-controlled feeders as well, it may however also entail problems. Mention should in particular be made of the problem already mentioned above of voltage-injecting operation of a converter-controlled feeder possibly leading to high power fluctuations when implemented. This may in turn lead to the problem of such voltage-injecting operation possibly reaching its limits when the required power for the power variation is not available, or is not available quickly enough. This may also lead, in particular in the case of wind power installations, to such a fast power fluctuation propagating to the mechanical system, in particular possibly leading to high torque fluctuations of the rotor of the wind power installation.

BRIEF SUMMARY

As provided herein, a positive effect is achieved on the electricity supply grid by way of converter-controlled feeders, in particular a damping effect is achieved on the electricity supply grid by converter-controlled feeders, without these converter-controlled feeders operating with voltage injection, at least not operating exclusively with voltage injection.

A method for feeding in electric power is provided. Electric power is accordingly fed into an electricity supply grid via a connection node by way of a converter-controlled infeed unit. The connection node is in particular a grid connection point at which the infeed unit feeds into the electricity supply grid. However, it is also possible for the connection node not to be a direct grid connection point, but rather for example a node in a wind farm grid containing multiple wind power installations, when the wind power installations of the wind farm form the respective infeed unit. Any explanations and embodiments that refer to the grid connection point, including explanations of a grid impedance, are also intended to refer to such a general connection node. Any explanations regarding the grid connection point are thus also explanations regarding the connection node that are not repeated merely for improved clarity.

A cited converter-controlled infeed unit is in particular a wind power installation or a wind farm that contains multiple wind power installations that jointly feed in at the grid connection point. A converter-controlled infeed unit is an infeed unit that feeds into the electricity supply grid using one or more converters, or one or more inverters. A difference between a converter, on the one hand, and an inverter, on the other hand, is irrelevant to the present description.

The electricity supply grid has a grid voltage and a grid frequency. The electricity supply grid is furthermore characterized by a grid nominal voltage and a grid nominal frequency. This denotes the two variables that the electricity supply grid should have during normal operation. The grid nominal frequency is usually 50 hertz (Hz) or 60 Hz.

It is furthermore proposed for the grid voltage of the electricity supply grid to be acquired and for a delayed differential angle to be ascertained on the basis of the acquired grid voltage. The delayed differential angle corresponds to a difference between an acquired phase signal that indicates a temporal profile of a phase angle of the grid voltage, on the one hand, and a phase signal that is delayed with respect to the acquired phase angle, on the other hand. The delayed phase signal may in this respect be a pure calculated variable that is determined, in particular calculated, from the acquired phase signal by a delay element.

A grid impedance effective for the connection node, in particular for the grid connection point, is furthermore acquired. Such an effective grid impedance is in particular an impedance between the grid connection point or other connection node and a reference point, which may also be a virtual reference point. Such a grid impedance may be calculated as the quotient between the grid nominal voltage and a short-circuit current at the grid connection point. The short-circuit current at the grid connection point is the current that arises when a short circuit occurs at the grid connection point when the infeed unit is not connected. In other words, the short-circuit current is the current that is supplied by the electricity supply grid in the event of a short circuit at the grid connection point.

Such a grid impedance has been identified as an important variable for controlling the infeed. This grid impedance, which may in this respect also be referred to as grid impedance of the grid connection point, in particular indicates how smooth the electricity supply grid is with respect to the grid connection point. In the event of a large grid impedance, a very smooth grid is assumed with respect to the grid connection point. A short-circuit current ratio, which is a quotient between a short-circuit current at the grid connection point and a rated current of the infeed unit at the same grid connection point, may be used as assessment criterion. The short-circuit current is the current that the electricity supply grid provides at the grid connection point in the event of a short circuit there, that is to say the current that is provided in the case of the explained short-circuit current.

The proposed method is particularly preferably used when the short-circuit current ratio is large, in particular greater than 8 or more preferably greater than 10. It has in particular been identified here that a current-injecting method is practical. Current-injecting infeed has the advantage that it responds little to voltage fluctuations in the event of large short-circuit current ratios, unlike voltage-injecting infeed. Voltage fluctuations in the electricity supply grid are forwarded to the grid connection point to a particularly great extent in the event of a large short-circuit current ratio, that is to say in the event of a small grid impedance. The current-injecting infeed is therefore proposed here, this responding little to voltage fluctuations, but still being able to achieve grid stabilization in a manner similar to voltage-injecting infeed.

It is furthermore proposed for an infeed power to be predefined on the basis of the delayed differential angle and on the basis of the acquired grid impedance.

Generating the delayed phase signal results in a delayed differential angle that is dependent on changes in the acquired phase signal. The acquired phase signal and thus also the delayed phase signal basically denote a phase position, that is to say not a phase angle that revolves at the grid frequency, but rather a phase that has a substantially constant value. If the acquired phase signal changes, for example by increasing from 10° to 20°, the delayed phase signal follows with a corresponding delay. The delayed phase signal may then likewise increase from 10° to 20°, but reaches these 20° somewhat later. This leads to the delayed differential angle being particularly relevant in this transition region. If the transition region in which the acquired phase signal has thus changed ended long enough ago, the delayed phase signal may have reached the value of the acquired phase signal, meaning that the delayed differential angle has again assumed the value zero.

This delayed phase angle thus has a particular influence on predefining the infeed power in this transition region. The infeed power is furthermore predefined on the basis of the acquired grid impedance. This predefining of the infeed power thus in particular takes into consideration how smooth the electricity supply grid is at the grid connection point.

It has in particular been identified that it is possible to use the delayed differential angle to acquire, at least estimate, a power demand, which may be associated with the underlying change in the acquired phase signal. It has additionally been identified that the grid impedance may be used to acquire or at least estimate how much power infeed or change in the power infeed is permissible without jeopardizing stability. It has also been identified that the infeed or change in the infeed of the electric power itself may lead to a phase angle or a change in a phase angle caused by the grid impedance. This may thus also be taken into consideration when predefining the infeed power on the basis of the acquired grid impedance.

The infeed power may also be predefined using an infeed current, such that the latter would be predefined on the basis of the delayed differential angle and on the basis of the acquired grid impedance. However, this does not involve predefining a current vector in terms of absolute value and phase, but rather the amplitude, that is to say in particular the root mean square of the infeed current. In the case of a constant voltage, this is proportional to the infeed power.

According to one aspect, it is proposed for the acquired phase signal to indicate a phase position in the sense of a non-revolving phase angle, for the acquired phase signal to be routed via a delay element in order to generate the delayed phase signal, and for the delayed differential angle to be formed as the difference between the acquired phase signal and the delayed phase signal.

The delay element may in particular be in the form of a first-order delay element. This makes it possible to rule out this delay element oscillating. If the acquired phase signal that indicates a phase position in the sense of a non-revolving phase signal is routed via such a delay element, the same value at the output of the delay element as at the input arises in the stationary state. Only in the event of changes in the acquired phase signal does the delay element lead to a different signal at its output, and thus to a delayed differential angle other than zero.

This phase position in the sense of a non-revolving phase angle may for example be generated through comparison with a reference signal of the same or a similar frequency. A reference signal may in particular be generated at the grid nominal frequency. This reference signal, which may also be in the form of a reference voltage signal, may in this respect be reproduced by a voltage vector revolving at the grid frequency. The acquired grid voltage may likewise be reproduced by a revolving voltage vector, specifically revolving at the grid frequency. In the stationary or quasi-stationary state, that is to say when both the reference voltage and the acquired voltage revolve at the grid nominal frequency, that is to say when the grid frequency corresponds to the grid nominal frequency, this results in a fixed angle between the acquired voltage signal and the reference voltage signal, which fixed angle denotes the phase position. The temporal profile of this fixed angle denotes the acquired phase signal. In said state in which the grid frequency corresponds to the grid nominal frequency, the acquired phase signal is thus a constant value.

If the grid voltage then changes in terms of its frequency, the angle between acquired voltage signal and reference voltage signal changes. In other words, the two voltage vectors then no longer run in absolute synchronicity with one another, thereby resulting in the change in angle between these two vectors. The phase position then thus changes.

To stay with this example of the reference signal, if the grid frequency always does not correspond to the grid nominal frequency, for example is always somewhat greater, the voltage vector of the acquired grid voltage always moves more quickly than the vector of the reference voltage. This may lead to the differential angle between these two vectors, and thus the phase position, continuously increasing and possibly also becoming greater than 360°. However, such a process would be very slow and would thus also not describe a revolving phase angle for the phase position, but rather only a slowly changing angle, that is to say a slowly changing phase position.

In the case of a slow change in the phase position, the delayed phase signal may still at least approximately reach the value of the acquired phase signal, even though this rises constantly (or drops in another case).

However, it is also possible to determine the phase position in another way than using a voltage reference signal that is fixedly characterized by the grid nominal frequency. By way of example, such a reference voltage signal may be adapted to the grid frequency if this always deviates from the grid nominal frequency. This would again result in a constant value for the phase position in the stationary or quasi-stationary state.

According to one aspect, it is proposed for the delay between acquired phase signal and delayed phase signal to be characterized by a delay time constant that is in the range of 1-10 seconds. It is in particular proposed for the delay to be achieved using a delay element that is in the form of a first-order delay element, with the delay time as time constant of the delay element.

The use of a first-order delay element is preferred, and one of these is basically uniquely characterized in terms of its dynamic range by a time constant. The time constant of a first-order delay element indicates the time after which a jump response has reached the value of 63% of the input jump. This time constant of the delay element is thus the delay time constant.

The delay may however also be achieved in other ways, for example using a higher-order delay element, which may however be similar to the 1st-order delay element. In this case too, it is possible for example to adopt the temporal value after which the jump response has reached 63% as delay time constant. However, it is also possible to use a higher-order delay element or a higher-order delay dynamic range, wherein a main time constant, in particular the largest time constant, corresponds to the delay time constant.

In any case, it is important for the delay time constant to be greater than a system-defined time constant, such as for example a time constant resulting from a sampling time constant in the case of a time-discrete system, or than a physically defined time constant, for example defined by the dynamic range of a voltmeter.

At the same time, the delay time constant should however also not be too large. A time constant having the values of 1-10 seconds is thus selected at a grid nominal frequency of 50 Hz, this corresponding to 50 times to 500 times the period duration of the voltage signal. A similar order of magnitude is also present when using an electricity supply grid having a grid nominal frequency of 60 Hz.

The selection of the delay time constants in the range of 1-10 seconds also makes it clear that this is significantly greater than a time constant of a grid filter.

As already mentioned, according to one aspect, it is proposed for the phase signal to indicate a phase angle of a voltage phase with respect to a reference phase. It is thus possible here to use a phase angle between the acquired grid voltage and a reference phase that oscillates at a similar frequency, in particular the grid nominal frequency. The resultant phase signal, in the stationary or quasi-stationary state, thus represents a value that is fixed over time.

According to one aspect, it is proposed, in order to predefine the infeed power on the basis of the acquired grid impedance, to correlate the delayed differential angle with a phase shift between current and voltage resulting from the acquired grid impedance. The delayed differential angle is thus correlated with a phase shift via the grid impedance. It has been identified that the power demand is thereby basically correlated with a potential of the power transmission capability via the grid impedance. The delayed differential angle is in this case an indicator of required power. The phase shift via the grid impedance, which is thus also a differential angle, is an indicator of the transmissible power via this grid impedance. Specifically, the greater this phase shift, the less power is able to be transmitted. This may thus be taken into consideration by acquiring the phase shift.

It has also been identified in this case that the delayed differential angle is able to be determined easily and also continuously. The delayed differential angle will normally have the value zero and will become relevant only in the event of changes, that is to say when there is a power demand. This may easily be correlated with the phase shift, because both variables are of the same type, that is to say are both phase shifts.

It is in particular proposed for the delayed differential angle to be correlated with a phase shift when a rated power of the infeed unit is transmitted via the grid impedance. In the case of a fixed grid impedance and usually fixedly predefined rated power of the infeed unit, the phase shift between current and voltage resulting from the grid impedance may be a constant. The reference of the delayed differential angle is established with respect thereto. This in particular makes it possible to determine an infeed power or a change in the infeed power in the form of an emulation of an instantaneous reserve. Such an instantaneous reserve is the short-term infeed of additional power when a correspondingly increased power demand occurs in the electricity supply grid, this being indicated by a frequency drop. This instantaneous reserve or corresponding power is targeted at the power demand and also at the options for providing same. Nevertheless, it is however also possible to take a changed grid impedance into consideration. Acquiring a grid impedance may however also mean acquiring this in a preliminary step if changes cannot be expected.

Regardless of whether the phase shift is with respect to a rated power or another value, it is in particular proposed for a quotient to be formed from the delayed differential angle and the phase shift. The delayed differential angle may thereby easily be correlated with the phase shift.

According to one aspect, in order to predefine the infeed power on the basis of the acquired grid impedance, it is proposed to form a quotient from the delayed differential angle and the phase shift between current and voltage resulting from the acquired grid impedance, wherein the phase shift φ is calculated using the formula:

$$\varphi = \arcsin\left(\frac{\sqrt{(P_N * Z)}}{V_N}\right)$$

In this formula, $P_N$ denotes a rated power of the feeder, $Z$ denotes the grid impedance and $V_N$ denotes the grid nominal voltage. The phase shift may thereby be calculated in an accurate and reproducible manner, provided that the grid impedance does not change, and thus form a good basis. Advantages of taking the phase shift into consideration have already been explained above and are just as applicable when the phase shift is calculated using the above formula.

According to one aspect, it is proposed for the grid impedance to constantly, in particular continuously, be acquired during ongoing operation of the wind power installation, in order thereby to obtain the acquired grid impedance. This may be achieved using measurements.

However, it is also possible to acquire the voltage in terms of absolute value and phase at a reference node in the electricity supply grid and at the grid connection point. A voltage drop in terms of absolute value and phase between the grid connection point and the reference point may be calculated therefrom. A quotient between this complex value of the voltage drop and the complex value of the infeed current gives the impedance between the grid connection point and the reference point. This may, depending on the selection of the reference point, be used as acquired grid impedance, or an acquired grid impedance may be projected therefrom.

It is in particular proposed to vary the fed-in current and to evaluate the response of the voltage at the grid connection point and to acquire the grid impedance therefrom. The fed-in current may also vary due to a natural fluctuation in the fed-in power, for example due to wind fluctuations.

According to one aspect, it is proposed for the method to be performed at a connection node, in particular at a grid connection point having a short-circuit current ratio of at least 8, in particular at least 10. The advantages in this regard have already been described above.

According to one aspect, it is proposed for the quotient of the delayed differential angle and the phase shift between current and voltage resulting from the acquired grid impedance to be formed as an assessment quotient, as a measure of an assessment of the delayed differential angle with respect to the phase shift, and for the assessment quotient, in order to predefine the infeed power, to be multiplied by a predetermined power value, in particular by the rated power of the infeed unit. The quotient between the delayed differential angle and the phase shift results in an abstract or relative measure of the infeed power. This measure takes into consideration the power demand and the potential for transmitting such infeed power. For the specific implementation, this abstract or relative measure may be multiplied by a predetermined power value. The rated power has turned out to be particularly practical here.

For example, if the delayed differential angle, to take an example that is easy to explain, corresponds to the phase shift, then the quotient is 1. The power demand corresponds here, likewise in simple terms, to the power it is practical to transmit. If this quotient is then multiplied by the rated power, the result may be that the infeed power should correspond to the rated power. If the delayed differential angle is however smaller, or becomes smaller again due to the delay function, then the predefined infeed power again accordingly likewise drops. The calculation thus proposed has thus led to a brief additional power infeed that has easily been calculated and has led to a practical value.

However, it is also possible, instead of rated power, to use another power and/or to provide a weighting function or a weighting factor, which is in particular less than 1 when using the rated power.

In addition to limiting the power able to be fed in, the available energy may also limit the infeed of additional power. Such limits on the available energy may in this case also be taken into consideration by the mentioned weighting function or the weighting factor. In addition or as an alternative, it is possible to set the time constant of the delay such that available energy is to be taken into consideration. If the time constant is shortened, the duration in which additional infeed power is fed in is also shortened, but without the amplitude increasing. Shortening the time constant of the delay may thus reduce the energy demand.

According to one aspect, it is proposed, in order to predefine the infeed power on the basis of the delayed differential angle and the acquired grid impedance, to determine an additional power on the basis of the delayed differential angle and the acquired grid impedance, and to add it to a setpoint power predefined independently of the delayed differential angle in order to predefine the infeed power as an overall power to be fed in. The infeed power thus consists of the setpoint power and the additional power.

The setpoint power is in particular the setpoint power that the infeed unit should feed in during normal operation, in particular during stationary or quasi-stationary operation, in which the grid frequency is substantially constant. The additional power is determined in addition thereto.

The additional power is in particular determined as has been explained in the above embodiments. It is then added to the setpoint power, and the overall result is the infeed power, which is thus of course also dependent on the delayed differential angle and the acquired grid impedance and is also predefined thereby on the basis of these two variables.

It may therefore be practical to configure the explained method such that the additional power is defined as being lower than the rated power of the infeed unit. Such a configuration may in particular be implemented when multiplying the assessment quotient by the predetermined power value. The predetermined power value may be selected accordingly for this purpose; it may in particular be selected to be significantly less than the rated power, or it is possible to select a weighting function or weighting accordingly less than 1. This is particularly practical when the assessment quotient is multiplied by the rated power of the infeed unit.

According to one aspect, it is proposed, in order to predefine the infeed current, for the assessment quotient to be multiplied by the predetermined power value, in particular to be multiplied by the rated power of the infeed unit, in order thereby to obtain the additional power. This results in a clear determination instruction using which a delayed phase signal, and from this a delayed differential angle, is able to be determined easily from the voltage signal with the delay function.

The assessment quotient is calculated using the differential angle and then needs to be multiplied only by the predetermined power value or the rated power, possibly multiplied by a weighting factor. The result is the additional power, which is fed in in addition to the power that is normally to be fed in. It is thereby possible to provide a self-contained process that is able to predefine such additional power also as a continuous specification by virtue of the proposed phase consideration.

According to one aspect, it is proposed for the additional power, which is added to the setpoint power predefined independently of the delayed differential angle, in order to predefine the infeed power as an overall power to be fed in, to be modified, in particular multiplied, by an adaptation term, in particular an adaptation factor that is between 0 and 1. It is in particular proposed for the adaptation term to be set on the basis of a or the setpoint power and/or a power currently being fed in.

It has been identified here that not every ideally determined additional power is also actually able to be added. It may be the case that only a relatively small amount of additional power is able to be added, that is to say be fed in in addition to the setpoint power. This may be taken into consideration by the adaptation term. This thus avoids the overall infeed power being clipped excessively often, or even at all, by an effective power restriction.

Such reductions may be dimensioned in preliminary trials. It has been identified in this case that there may be a dependency on the power currently being fed in. Since the power currently being fed in is however itself dependent on the additional power, it is proposed to take this into consideration using the setpoint power, that is to say using the setpoint power predefined independently of the delayed differential angle. However, it is also possible to take the power currently being fed in into consideration using a further delay, in order thereby to avoid an immediate retroactive effect.

The simplest and at the same time preferred variant is to adopt an adaptation factor. However, it is also possible to use an adaptation function that for example simultaneously takes into consideration the power currently being fed in or the setpoint power.

The multiplication, or other modification, may be implemented in a variety of ways. One option is to modify the rated power that is taken into consideration. If the adaptation factor is for example 0.5 and it should be multiplied by the additional power, the rated power may be halved for this purpose before it is multiplied by the assessment quotient.

A wind energy system is also proposed. The wind energy system has one or more wind power installations for feeding electric power into an electricity supply grid via a connection node, in particular at a grid connection point. The wind energy system may thus also be understood to be a wind power installation or a wind farm having multiple wind power installations. It is proposed for the wind energy system or each wind power installation to be in the form of a respective converter-controlled infeed unit, and for the electricity supply grid to have a grid voltage and a grid frequency and to be characterized by a grid nominal voltage and a grid nominal frequency. The wind energy system is furthermore configured such that the grid voltage of the electricity supply grid is acquired and a delayed differential angle is ascertained on the basis of the acquired grid voltage. The delayed differential angle corresponds to a difference between an acquired phase signal that indicates a temporal profile of a phase angle of the grid voltage and a phase signal that is delayed with respect to the acquired phase signal. A grid impedance effective for the grid connection point is furthermore acquired, and an infeed power is predefined on the basis of the delayed differential angle and on the basis of the acquired grid impedance.

The wind energy system, that is to say the individual wind power installation or else the wind farm having the multiple wind power installations, is in the form of a respective converter-controlled infeed unit. In the case of an individual wind power installation, this has one or more converters or inverters that feed into the electricity supply grid. If the wind energy system is in the form of a wind farm having multiple wind power installations, then each wind power installation may operate individually in a converter-controlled manner, meaning that the wind farm thereby also operates overall in a converter-controlled manner. It is also possible for a wind farm to centrally have a converter arrangement or inverter arrangement in order to collect the power to be fed in from the wind power installations and then to feed the power thus collected from the wind power installations into the electricity supply grid by way of this central converter arrangement or inverter arrangement.

The electricity supply grid is designed as already explained above with regard to the infeed method. The wind energy system is configured such that a grid voltage of the electricity supply grid is acquired, and may have one or more appropriate measuring devices for this purpose. Such measuring devices are often provided on each wind power installation, in particular when it has at least one converter or inverter for infeed purposes.

The wind energy system is furthermore configured so as to ascertain a delayed differential angle on the basis of the acquired grid voltage. An appropriate measuring device may be present for this purpose, or the measuring device for recording the grid voltage may be used. At the same time, provision is made for an evaluation unit (e.g., controller), which may also be part of the control system of the wind power installation or of the wind energy system. The evaluation unit is configured so as to provide the corresponding calculations. It may also operate a reference system. An appropriate calculation system or control system may be implemented as an evaluation program for this purpose.

The wind energy system is likewise configured such that a grid impedance effective for the grid connection point is acquired. This may also be achieved through a preliminary measurement and/or by inputting the grid impedance. The wind energy system is at least configured so as to take such a grid impedance into consideration. An appropriate program may be implemented, or it may be contained in the control system that is implemented.

An appropriate control system may furthermore implement or contain a specification whereby an infeed power is determined and thereby predefined by taking into consideration the delayed differential angle and taking into consideration the acquired grid impedance. A corresponding process may be implemented in a control system or evaluation unit.

According to one aspect, it is proposed for the wind energy system to be configured so as to perform a method according to one of the embodiments described above. It is in particular proposed for a central controller to be provided for this purpose, and/or for each wind power installation to have an installation control system in which the method is implemented. The method is thus implemented in the central controller, or in each installation control system of the individual wind power installation. If the wind energy system has only one wind power installation, the terms are synonymous. If the wind energy system has multiple wind power installations and the method is implemented on each installation control system, each installation control system, for its individual wind power installation, thus predefines an infeed power on the basis of the delayed differential angle and on the basis of the acquired grid impedance.

As an alternative, this may be performed in the central controller of the wind energy system. A combination is also possible. To this end, for example, the grid voltage may be acquired by one or more wind power installations and the result may be provided to the central controller for further processing and specifying the infeed power.

BRIEF DESCRIPTION OF THE SEVERAL VIEWS OF THE DRAWINGS

The invention is explained in more detail below by way of example on the basis of embodiments with reference to the accompanying figures.

DETAILED DESCRIPTION

Figure 1:
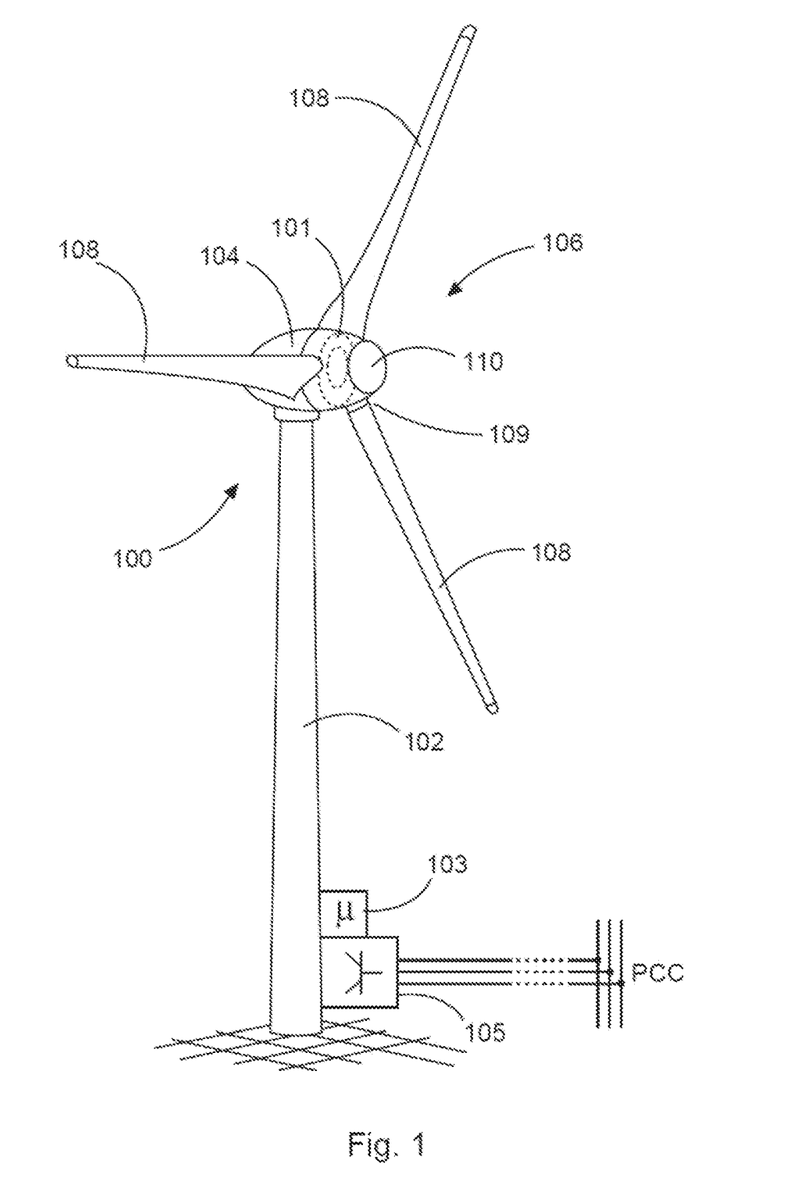
FIG. 1 shows a perspective illustration of a wind power installation.

FIG. 1 shows a schematic illustration of a wind power installation. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point (point of common coupling (PCC)). This may be performed directly or else together with other wind power installations in a wind farm. Provision is made for an installation control system (e.g., controller) 103 for the purpose of controlling the wind power installation 100 and also the infeed unit 105. The installation control system 103 may also receive predefined values from an external source, in particular from a central farm computer.

Figure 2:
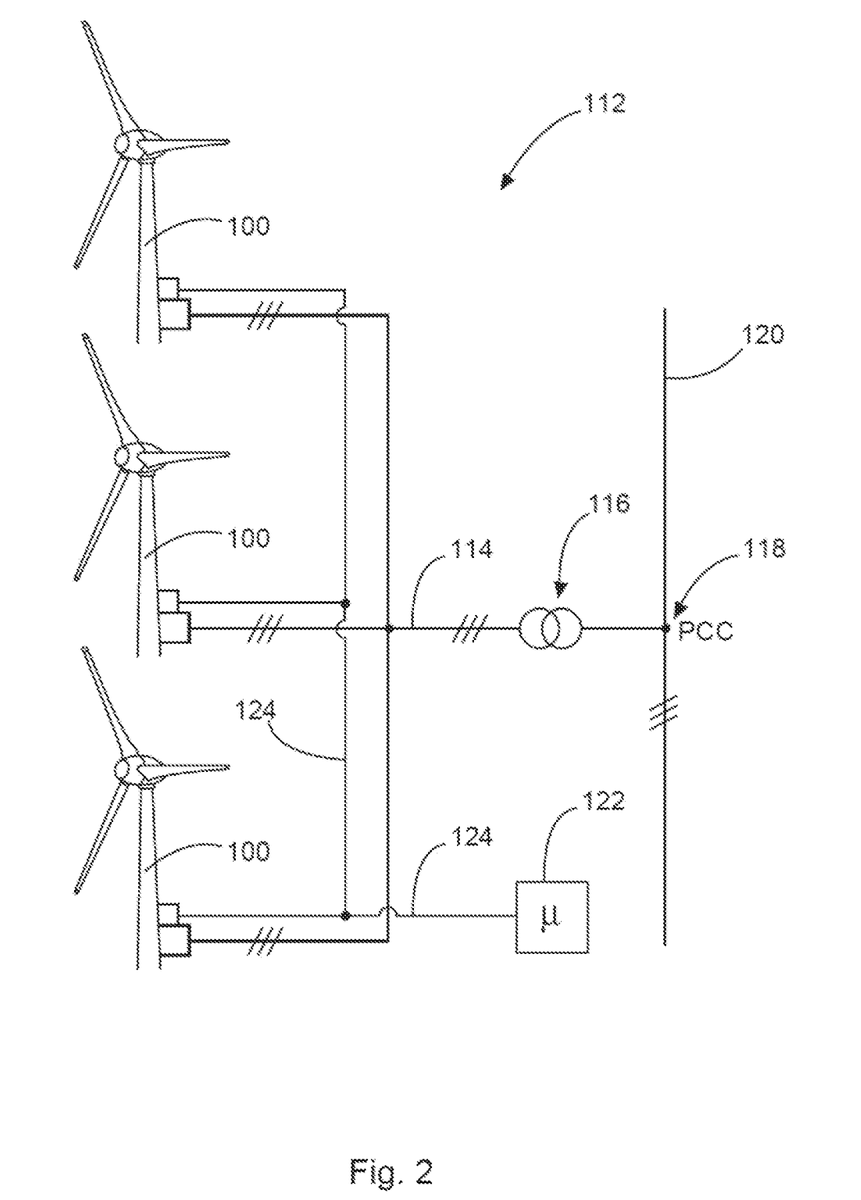
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added together and a transformer 116, which steps up the voltage in the farm, is usually provided in order to then feed into the supply grid 120 at the infeed point 118, which is also generally referred to as a PCC. FIG. 2 is only a simplified illustration of a wind farm 112. By way of example, the farm grid 114 may be designed in another way by virtue of for example a transformer also being present at the output of each wind power installation 100, to mention just one other exemplary embodiment.

The wind farm 112 additionally has a central farm computer 122, which may also be referred to synonymously as central farm control system (e.g., central farm controller). This may be connected, via data lines 124 or wirelessly, to the wind power installations 100 in order to exchange data with the wind power installations via this connection and, in particular, to receive measured values from the wind power installations 100 and transmit control values to the wind power installations 100.

Figure 3:
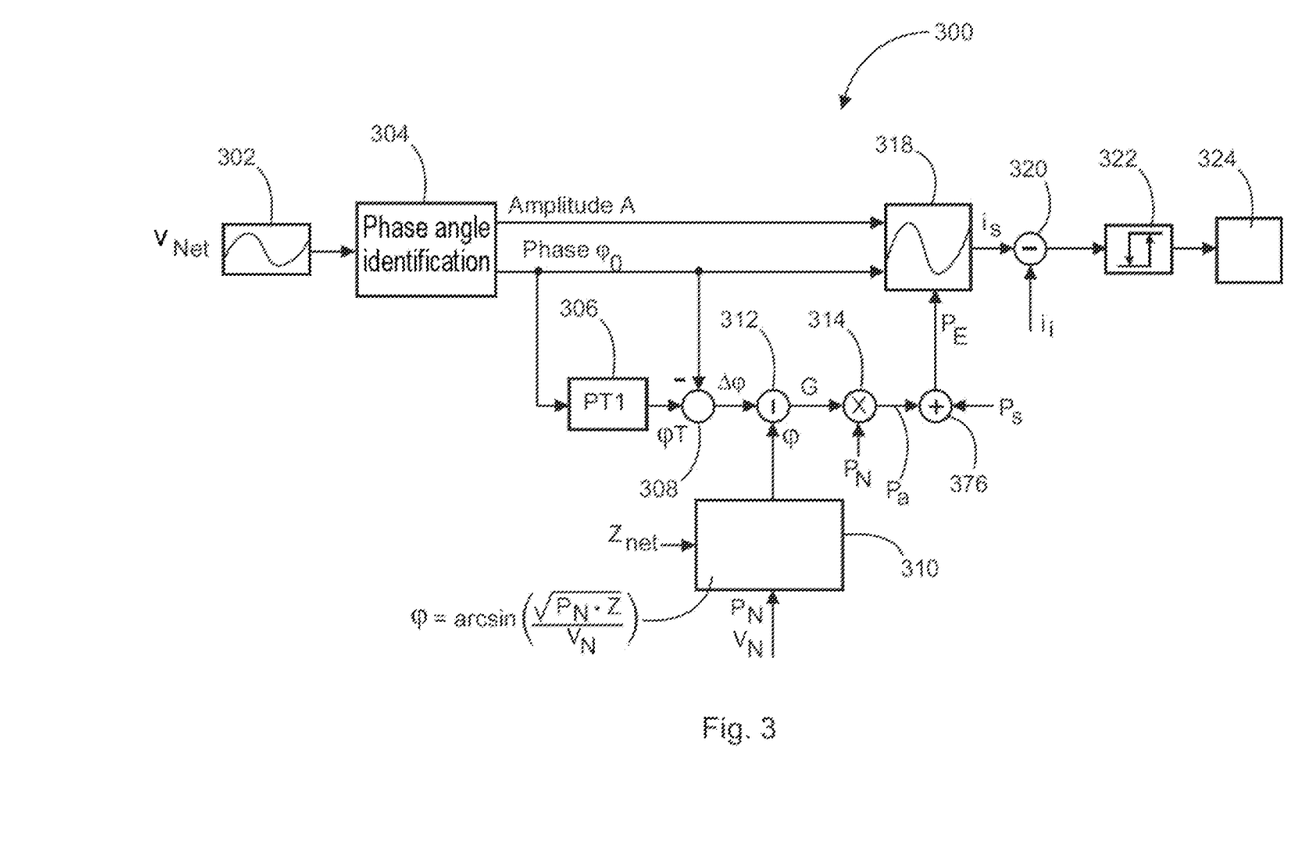
FIG. 3 shows a diagram for performing the proposed method.

FIG. 3 shows a flowchart 300 containing symbolic function blocks and links. The flowchart 300 starts with a voltage acquisition block 302, which may also represent the grid voltage as a whole. In any case, the grid voltage is acquired and transferred to the identification block 304. In the identification block 304, the amplitude A and a phase angle as phase $\varphi_0$ are acquired from the grid voltage. Both may be output continually and thus in the form of a time signal. The phase $\varphi_0$ thus represents a phase signal as a profile over time, which indicates a temporal profile of the phase angle of the grid voltage.

The phase signal $\varphi_0$ is routed via a delay element 306. This thus results in a delayed phase signal $\varphi_T$ at the output of the delay element 306. The phase signal $\varphi_0$, that is to say the non-delayed phase signal, is subtracted from this delayed phase signal $\varphi_T$ in the phase summing element 308, and this results in the delayed differential angle $\Delta\varphi$. The delayed differential angle $\Delta\varphi$ may also be referred to synonymously as delayed differential angle signal. This applies not only to this embodiment, but also generally.

It is furthermore proposed to take the grid impedance into consideration. The grid impedance block 310 is provided for this purpose. The grid impedance block 310 takes the grid impedance into consideration and calculates the phase shift $\varphi$ taking the grid impedance $Z_{net}$ into consideration. For this purpose, in addition to the grid impedance $Z_{net}$, the rated power $P_N$ of the relevant infeed unit and the nominal voltage $V_N$ are also taken into consideration. This may in particular be achieved using the formula that is input at the grid impedance block 310. The formula is placed outside the grid impedance block 310 only for space reasons. The formula, in the numerator, calculates the product of rated power and the grid impedance, and this product is square-rooted. The result is the voltage dropped across the grid impedance when rated power is transmitted via the grid impedance. This voltage is correlated with the grid nominal voltage $V_N$, specifically divided thereby. The result should be between 0 and 1. It tends toward 0 when no voltage is dropped across the grid impedance, that is to say the grid impedance tends toward 0, and the value tends toward 1 when the entire grid voltage drops across the impedance, but this does not constitute a realistic operating point. The arcsin is formed therefrom, this giving the phase shift $\varphi$, which is thus between 0 and 90°, at least theoretically.

It should be noted that the grid impedance is denoted only by Z in the formula for the sake of simplicity. However, it concerns the same grid impedance that is input into the grid impedance block 310 as grid impedance $Z_{net}$.

The result of the grid impedance block 310 is thus the phase shift φ, which specifically refers to the rated power of the infeed unit. The grid impedance, and also the rated power of the infeed unit, are thereby taken into consideration in this phase shift φ.

To this end, it is proposed to divide the delayed differential angle Δφ by this phase shift φ. The division element 312 is provided for this purpose. The result is a quotient of the delayed differential angle Δφ and the phase shift φ. This quotient may be considered to be a weighting G. It should be expected that the quotient, and thus the weighting G, will be considerably less than 1. However, it is also possible for the weighting G to be adapted by a predeterminable adaptation factor that is between 0 and 1 if preliminary tests have shown that the weighting G may become too large and should be scaled down.

The weighting function G, possibly a weighting function modified by an adaptation factor, is then multiplied by the rated power $P_N$ of the infeed unit in the product element 314. The result is an additional power $P_a$. The additional power $P_a$ may also be multiplied by an adaptation factor for the same effect. This additional power $P_a$, with or without modification by an adaptation factor, is added to the setpoint power $P_s$ at the power summing point 316. This results in an infeed power $P_E$ that is transferred to a current-predefining block 318 as new power setpoint value.

The current-predefining block 318 may in particular predefine a current vector for the current to be fed in, or multiple current vectors taking the multiple phases into consideration. The voltage amplitude A and the phase signal $φ_0$ may be taken into consideration for this purpose. The result is thus a setpoint current is. This may be compared to an actual current $i_t$ at the current summing point 320, and the inverter or converter 322 used for the infeed may be actuated accordingly. This converter 322 is symbolized here by a hysteresis block that is intended to indicate a tolerance band method for the current infeed. The result of the converter 322 is thus fed into the electricity supply grid 324.

The proposed method may be used to at least partially provide a property of voltage-injecting converters, but without providing true or complete voltage injection. Specifically, the short-term dynamic range of true voltage-injecting converters is in particular dispensed with here. However, the proposed method may be used to quickly provide an instantaneous reserve, and this may also achieve damping properties for the electricity supply grid.

Existing regulation architectures may be used in the proposed method. It is possible to provide an instantaneous reserve using current-injecting converters. It is thus also possible to provide a behavior equivalent to a flywheel mass.

Current regulation is used or remains unchanged in the proposed method. In order to determine the additional power to emulate an instantaneous reserve, the phase angle signal or the phase signal $φ_0$ is supplied to a first-order delay element. The original signal is subtracted from the delayed signal. The result is a phase difference. This is divided by the calculated phase difference at rated power, which is specifically calculated on the basis of the grid impedance. The result is multiplied by the rated power.

This results in a differential power that is supplied to the converter control system or the power control system. Specifically, it may be added there, as shown in FIG. 3, to the setpoint power. Using a new power value created in this way, the infeed may then be performed in the otherwise usual way, specifically using current regulation or current-injecting infeed.

The power value added in this way, specifically the additional power $P_a$, is basically supplied to the converter regulation system according to FIG. 3. However, it is also possible for the additional power $P_a$ to be supplied to a superordinate power regulation system and for the setpoint power to be changed accordingly there.

Of course, it is possible to provide limits should the additional power $P_a$ become too great, or it is accepted to implement a correspondingly changed power setpoint value only up to the maximum possible power.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electric power into an electricity supply grid via a connection node using a wind power installation or a wind farm,
   wherein the electricity supply grid has a grid voltage and a grid frequency, and the electricity supply grid is associated with a nominal grid voltage and a nominal grid frequency,
   the method comprises:
   determining the grid voltage of the electricity supply grid;
   determining a delayed differential angle based on the grid voltage, wherein the delayed differential angle corresponds to a difference between a determined phase signal that indicates a temporal profile of a phase angle of the grid voltage and a phase signal that is delayed with respect to the determined phase signal;
   determining a grid impedance for the connection node; and
   setting an infeed power of the wind power installation or the wind farm based on the delayed differential angle and the grid impedance.

2. The method as claimed in claim 1, wherein:
   the determined phase signal indicates a phase position as a non-revolving phase angle,
   the determined phase signal is delayed, via a delay element, to generate the delayed phase signal, and
   the delayed differential angle is determined as a difference between the determined phase signal and the delayed phase signal.

3. The method as claimed in claim 2, wherein a delay between the determined phase signal and the delayed phase signal is associated with a delay time constant in a range of 1 to 10 seconds.

4. The method as claimed in claim 3, wherein the delay element is a 1st-order delay element, and the delay time constant is a time constant of the delay element.

5. The method as claimed in claim 1, wherein the phase signal indicates a phase angle of a voltage phase with respect to a reference phase.

6. The method as claimed in claim 1, wherein setting the infeed power based on the grid impedance includes:
   correlating the delayed differential angle with a phase shift between current and voltage resulting from the grid impedance; and/or determining a quotient of the delayed differential angle and the phase shift.

7. The method as claimed in claim 6, wherein the delayed differential angle is correlated with the phase shift when transmitting a rated power of the wind power installation or wind farm.

8. The method as claimed in claim 1, wherein setting the infeed power based on the grid impedance includes:
determining a quotient of the delayed differential angle and a phase shift between current and voltage resulting from the grid impedance, wherein
the phase shift φ is determined as:

$$\varphi = \arcsin\left(\frac{\sqrt{(P_N * Z)}}{V_N}\right),$$

wherein
$P_N$ denotes a rated power of the wind power installation or wind farm,
Z denotes the grid impedance, and
$V_N$ denotes the nominal grid voltage.

9. The method as claimed in claim 1, comprising:
continually determining the grid impedance during ongoing operation of the wind power installation or the wind farm.

10. The method as claimed in claim 1, wherein the connection node is a grid connection point having a short-circuit current ratio of at least 8.

11. The method as claimed in claim 1, comprising:
determining an assessment quotient, wherein the assessment quotient is a quotient of the delayed differential angle and a phase shift between current and voltage resulting from the grid impedance, wherein the assessment quotient is a measure of an assessment of the delayed differential angle with respect to the phase shift; and
multiplying the assessment quotient by a predetermined power value to set the infeed power.

12. The method as claimed in claim 11, wherein the predetermined power value is a rated power of the wind power installation or the wind farm.

13. The method as claimed in claim 1, wherein setting the infeed power based on the delayed differential angle and the grid impedance includes:
determining an additional power based on the delayed differential angle and the grid impedance; and
adding the additional power to a setpoint power determined independently of the delayed differential angle to set the infeed power as an overall power to be fed in.

14. The method as claimed in claim 13, comprising:
multiplying an assessment quotient by a predetermined power value to obtain the additional power.

15. The method as claimed in claim 14, wherein the predetermined power value is a rated power of the wind power installation or the wind farm.

16. The method as claimed in claim 13, comprising:
multiplying the additional power by an adaptation factor that is between 0 and 1; and
setting the adaptation factor based on the setpoint power and/or a power currently being fed in.

17. A wind energy system, comprising:
one or more wind power installations configured to feed electric power into an electricity supply grid via a connection node, wherein:
the wind energy system or each wind power installation of the one or more wind power installations is converter-controlled, and
the electricity supply grid has a grid voltage and a grid frequency and is associated with a nominal grid voltage and a nominal grid frequency; and
a central controller configured to:
determine the grid voltage of the electricity supply grid;
determine a delayed differential angle based on the grid voltage, wherein the delayed differential angle corresponds to a difference between a determined phase signal that indicates a temporal profile of a phase angle of the grid voltage and a phase signal that is delayed with respect to the determined phase signal;
determine a grid impedance for the connection node; and
set an infeed power for the wind energy system based on the delayed differential angle and the grid impedance.

* * * * *